United States Patent [19]
Welles, II

[11] Patent Number: 5,483,139
[45] Date of Patent: Jan. 9, 1996

[54] MOTOR START, REVERSE AND PROTECTION SYSTEM WITHOUT A STARTING CAPACITOR

[75] Inventor: Kenneth B. Welles, II, Scotia, N.Y.

[73] Assignee: General Electric Company, Schenectady, N.Y.

[21] Appl. No.: 209,588

[22] Filed: Mar. 14, 1994

[51] Int. Cl.⁶ ........................................................ H02P 1/00
[52] U.S. Cl. ............................................. 318/782; 361/24
[58] Field of Search ..................................... 318/778, 779, 318/781, 782, 783, 785, 786, 798–802, 806; 361/23, 24, 31

[56] References Cited

U.S. PATENT DOCUMENTS

| | | | |
|---|---|---|---|
| 3,414,789 | 12/1968 | Prouty . | |
| 3,529,221 | 9/1970 | Reinke . | |
| 3,530,348 | 9/1970 | Conner . | |
| 3,766,457 | 10/1973 | Fink, Jr. et al. | 318/786 |
| 3,882,364 | 5/1975 | Wright et al. | 318/786 |
| 3,919,600 | 11/1975 | Sons . | |
| 3,970,908 | 7/1976 | Hansen et al. | 318/786 |
| 4,060,754 | 11/1977 | Kirtley et al. | 318/778 |
| 4,145,646 | 3/1979 | Werderitch . | |
| 4,375,613 | 3/1983 | Fuller et al. . | |
| 4,401,933 | 8/1983 | Davy et al. | 318/778 |
| 4,409,532 | 10/1983 | Hollenbeck et al. . | |
| 4,513,342 | 4/1985 | Rocha . | |
| 4,520,303 | 5/1985 | Ward . | |
| 4,525,763 | 6/1985 | Hardy et al. | 361/24 |
| 4,527,214 | 7/1985 | Hattori et al. | 361/24 X |
| 4,623,967 | 11/1986 | Naimer . | |
| 4,770,417 | 9/1988 | Blair | 318/484 |
| 5,013,990 | 5/1991 | Weber | 318/812 X |
| 5,017,853 | 5/1991 | Chmiel | 318/786 |
| 5,103,154 | 4/1992 | Dropps et al. . | |
| 5,126,961 | 6/1992 | Garverick . | |
| 5,225,992 | 7/1993 | Kobari et al. | 361/24 X |

Primary Examiner—Jonathan Wysocki
Attorney, Agent, or Firm—Ann M. Agosti; Marvin Snyder

[57] ABSTRACT

A single phase induction motor includes a start winding, a run winding coupled in parallel with the start winding, a start switch, and a run switch. A control circuit is provided for selectively supplying voltage to the start and run windings. A current sensor is coupled to the control circuit and the start and run windings for estimating the temperature rise of the motor and turning the motor off if overheated. An alternating voltage having a plurality of 360° cycles can be continuously applied to the run winding through the run switch. The alternating voltage is repetitively applied through the start switch to the start winding in the range of 45° to 135° into each respective one of the plurality of cycles and ending at approximately 180° into each respective cycle and beginning in the range of 225° to 315° into each respective cycle and ending at approximately 360° into each respective cycle until the motor is running at a speed close to synchronous speed.

30 Claims, 4 Drawing Sheets

MOTOR START, REVERSE AND PROTECTION SYSTEM WITHOUT A STARTING CAPACITOR

BACKGROUND OF THE INVENTION

1. Field of the Invention

This invention relates generally to induction motors, and, more particularly, to reversible single phase induction motors having overheating protection and the capability of starting without starting capacitors.

2. Description of the Related Art

In order to start a single phase induction motor, a quasi-second phase is needed. One method for providing the required phase shift is to couple an auxiliary winding from the single phase supply via a capacitor. The capacitor, which is commonly referred to as a starting capacitor in this context, increases the cost and size of the circuit and can sometimes decrease circuit reliability.

A method for providing a quasi-second phase without using a starting capacitor is embodied in a split phase motor in which an auxiliary winding with higher resistance than a primary run winding is used to create the phase shift. The resulting torque for a split phase motor is typically lower than desired.

Ward, U.S. Pat. No. 4,520,303, issued May 28, 1985, describes a self-starting single phase induction motor wherein the required quasi-second phase for starting the motor is provided by controlling the phase of the voltage applied to one stator winding of the motor relative to the phase of the voltage applied to another stator winding of the motor by means of an electronic switching arrangement and an associated control circuit.

Generating a phase shift by controlling relative phases of stator windings with the voltage sequences described in Ward results in a starting torque which can be too low for some motors. Furthermore it would be desirable to have a control circuit capable of performing the functions of overheating protection and motor speed control in addition to generating a quasi-second phase, especially if a universal circuit for overheating protection could be designed. Conventional overheating protection devices for protecting motors from thermal damage include a bimetallic element which bends in response to temperature levels and at a predetermined temperature level causes a switch to open. Because different types of motors have different temperature limitations, when conventional overheating protection devices are used, the different types of motors require distinct overheating protection devices with different bimetallic material compositions.

SUMMARY OF THE INVENTION

Accordingly, an object of the present invention is to provide a reversible single phase induction motor having overheating protection and the capability of starting without a starting capacitor, and a method for its fabrication.

Another object of the present invention is to provide an applied voltage sequence for furnishing high starting torque when used with start and run windings of an induction motor.

Still another object of the present invention is to provide a universal overheating protection system which can be used with any single phase induction motor.

Briefly, in accordance with a preferred embodiment of the invention, a motor comprises a start winding, a run winding coupled in parallel with the start winding, a start switch, and a run switch. A control circuit is provided for selectively supplying voltage to the start and run windings by controlling the start and run switches which are coupled between the start winding and the control circuit and between the run winding and the control circuit, respectively. A current sensor is coupled to the control circuit and the start and run windings. The start and run switches may comprise triacs; the current sensor may comprise a resistor for converting current to a corresponding analog voltage signal; and the control circuit preferably includes means for converting the analog voltage signal to a digital voltage signal and calculating means for using the digital voltage signal for estimating temperature rise of the motor.

In accordance with another preferred embodiment of the invention, a motor overheating protection system comprises means for measuring current on a run winding; means for converting the current to a digital voltage signal; and calculating means for using the digital voltage signal for estimating temperature rise of the motor.

In accordance with another preferred embodiment of the invention, a method for starting a motor comprises continuously applying an alternating voltage to a first winding. The alternating voltage is repetitively applied to a second winding beginning in the range of 45° to 135° into a respective cycle and ending at approximately 180° into the respective cycle and again beginning in the range of 225° to 315° into the respective cycle and ending at approximately 360° into the respective cycle, and repeated for subsequent cycles until the motor is running at close to synchronous speed, i.e. a speed high enough that the first winding alone supplies sufficient torque for operation.

In accordance with another preferred embodiment of the invention, a method for starting a motor comprises repetitively providing a sequence in which an alternating voltage is applied to a first winding for a first fraction of a cycle in duration; the alternating voltage is applied to a second winding for a second fraction of a cycle in duration; and an interval is provided in which neither winding receives alternating voltage for a third fraction of a cycle in duration. After repeating the sequence until a predetermined speed is reached, the alternating voltage is continuously applied to the second winding.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION OF A PREFERRED EMBODIMENT OF THE INVENTION

Figure 1:
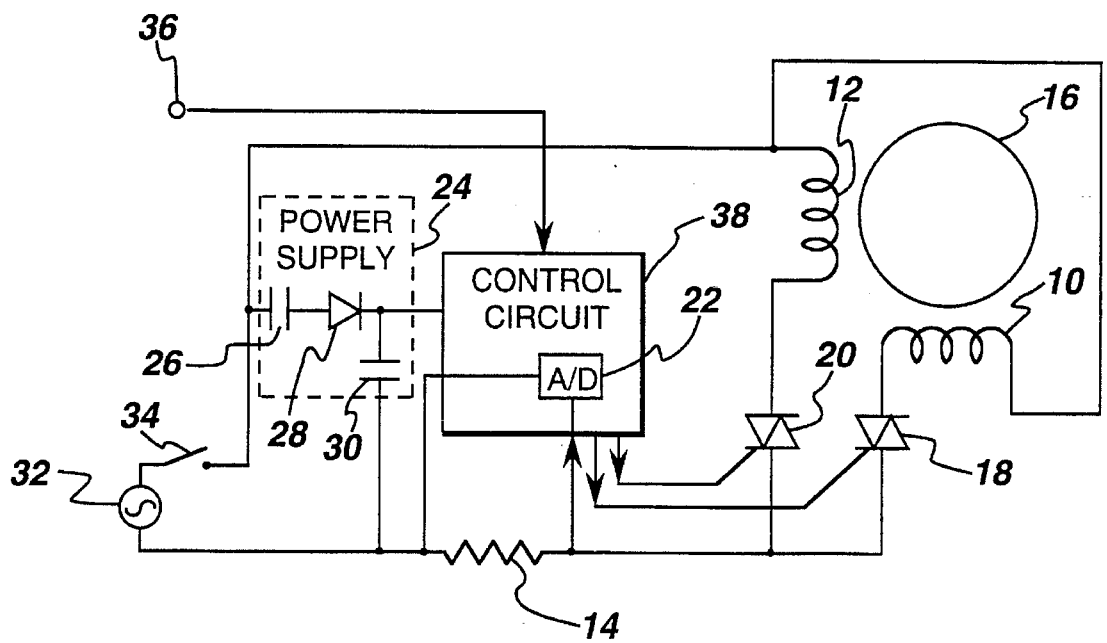
FIG. 1 is a circuit diagram of one embodiment of a motor and associated circuitry of the present invention.

FIG. 1 is a circuit diagram of one embodiment of an electronic start motor and associated circuitry of the present invention. As part of a stator, a start winding 10 is coupled in parallel with a run winding 12 for providing torque to a rotor 16. Both windings are further coupled to a power supply 24 through a control circuit 38. In one embodiment, power supply 24 comprises a first capacitor 26 coupled between one side of a diode 28 and one side of an AC source 32, such as 110 volts, through a switch 34, and a second capacitor 30 coupled between the other side of diode 28 and the other side of AC source 32.

Start winding 10 and run winding 12 are coupled to control circuit 38 through switches shown as start triac 18 and run triac 20. Triacs are useful because they are inexpensive and are switched off when the load current is close to zero (a feature which decreases complexity in the circuit). The illustration of triacs, however, is for example only; other switches which can operate quickly, such as field effect transistors, can alternatively be used, if desired.

A current sensor 14 is coupled to the start and run windings. In one embodiment, the current sensor comprises a resistor of appropriate size, such as 0.1 ohm, coupled to control circuit 38, for example, which measures the voltage drop across the resistor. Preferably, the current sensor is coupled to a portion of the control circuit containing an analog-to-digital (A/D) converter 22, to convert the voltage across the resistor to a digital voltage signal. In one embodiment, a semiconductor integrated circuit chip such as the analog-to-digital converter in a circuit breaker controller chip described in Garverick, U.S. Pat. No. 5,126,961, issued to the instant assignee on Jun. 30, 1992, may be used.

To indicate motor overheating conditions, including overload and locked rotor conditions, a thermal model can be approximated for use in calculations relating to how the temperature rise of a motor varies with time, applied current, and speed. One example of an approximate equation is the following:

$$T_r = T_m - T_a = \alpha \int (I \times V) dt - \beta \int T_r dt - \gamma \int \omega^n dt,$$

wherein $T_r$ represents the rise of the motor temperature $T_m$ above ambient temperature $T_a$; I is a numerical representation of the current flowing in the motor windings after it has been measured as an analog voltage signal and converted to a digital voltage signal; V represents the voltage applied to the motor windings; $\omega^n$ is a polynomial related to rotor rotational speed which depends on the motor configuration; t represents time; $\alpha$ is a motor-specific constant inversely proportional to thermal mass; $\beta$ is a motor-specific constant proportional to heat dissipation in free air; and $\gamma$ is a motor-specific constant proportional to the rate of cooling due to a motor fan. When the temperature rise reaches a predetermined value, control circuit 38 steps sending a signal that holds both triacs 18 and 20 in conduction, and the triacs then turn off (i.e. are switched into nonconduction) to protect the motor.

The overheating protection system of the present invention can be considered to be a universal overheating protection system because one standard circuit can be used for various types of motors, with the only difference being that different types of motors would require programming of different types of $\omega^n$ polynomials and different values of $\alpha$, $\beta$, and $\gamma$ during or after assembly. Using this universal overheating system invention, a factory can stock one type of protection device for use in all induction motors with only slight modifications in the programming process to match the specific type of motor. This system is especially helpful in detecting overheating due to overload conditions wherein the load is so high that the rotor is turning more slowly than desired and requires more current (thus causing a motor temperature increase).

The current sensing capabilities of this overheating protection system may also be used to detect conditions such as a locked rotor or a broken belt in an appliance such as a washer. A locked rotor can be detected by determining that the measured current never decreases below a predetermined locked rotor current value and sending, in response thereto, an appropriate alarm signal to a control panel. A broken belt can be detected by determining that the measured current is below a predetermined load current value, indicating that the motor thus has no load.

Figure 2:
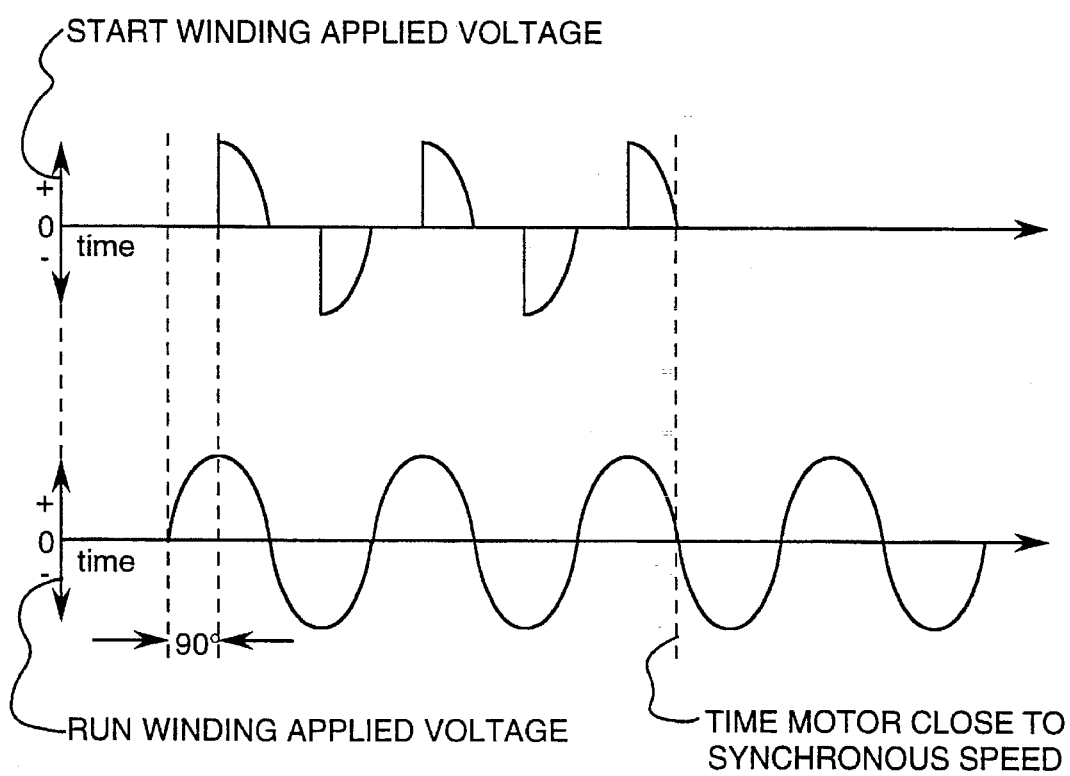
FIG. 2 illustrates waveforms of certain voltages present in the motor of FIG. 1 in forward operation.

FIG. 2 illustrates waveforms of certain voltages appearing in the motor of FIG. 1 when in forward operation. When the motor is initially energized and rotor 16 is not yet rotating, control circuit 38 continuously applies an alternating phase-shifted line voltage to run winding 12 and repetitively applies the alternating voltage to start winding 10 by switching on start triac 18 at approximately 90° and 270° into each alternating voltage cycle. The triacs are automatically switched off when the load current, which is an alternating current, is close to zero (at approximately 180° and 360°, respectively, in the cycle). If a different type of switch is used, then control circuit 38 sends a signal to stop applying the alternating voltage to start winding 10 at approximately 180° and 360°, respectively, in the cycle.

Although in the preferred embodiment the repetitive application of alternating voltage to the start winding begins at approximately 90° and 270° into each respective cycle, any beginning point in the respective ranges of 45°–135° and 225°–315° would be acceptable.

An asymmetrical current waveform (not shown), which occurs when the voltage is applied to the run winding before the start winding, causes the phase of the run winding current to lead the start winding voltage (or the start winding current to lag), and thus provides a sufficient amount of phase shift (approximately 40°–50°) in the current of the start winding to provide direction control and create starting torque for the rotor which is initially stationary.

The current employed in starting the motor is measured in control circuit 38 by A/D converter 22. This current typically is a high value initially, which then decreases as the rotor begins turning. When the value of the current indicates that the rotor is close to synchronous speed, i.e. a speed high enough that the run winding alone supplies sufficient torque for operation (typically about ¾ of synchronous speed), the control circuit switches start triac 18 off, thus leaving the motor running in the forward direction with only run winding 12 receiving voltage. The amount of current indicating that a speed close to synchronous speed has been reached varies with the type of motor. After the start triac is switched off, the motor speed gradually increases to about 95%–97% of synchronous speed.

Figure 3:
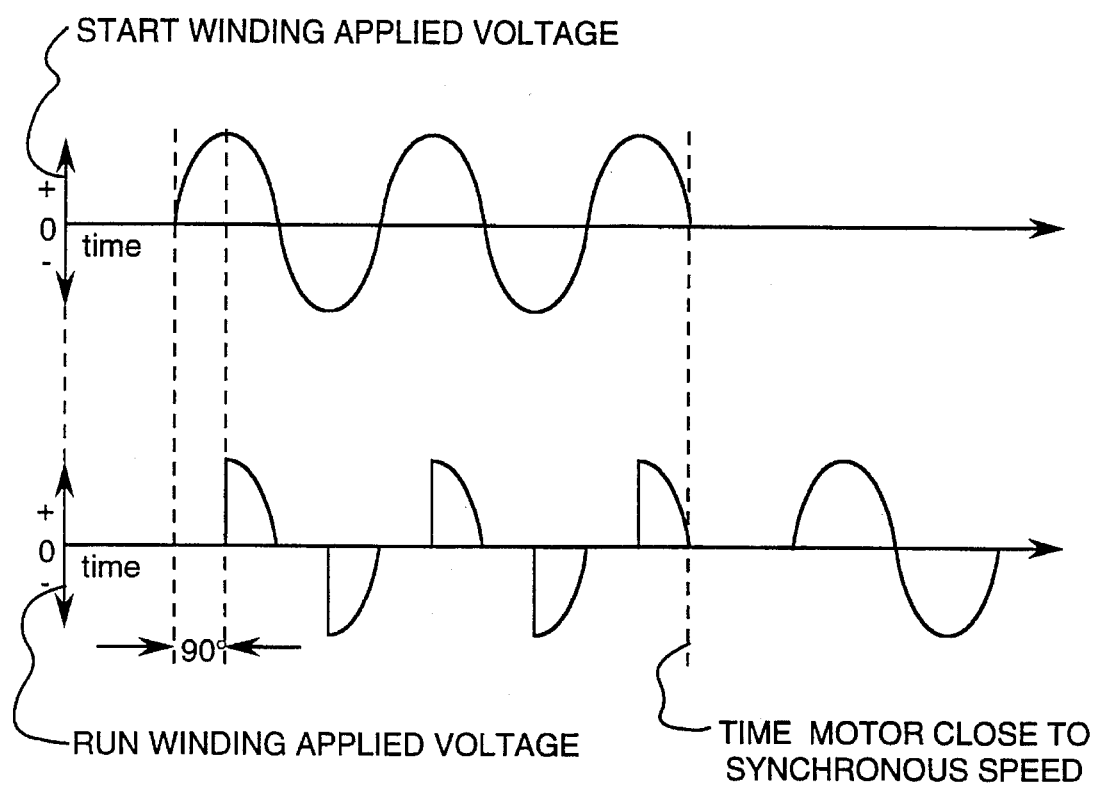
FIG. 3 illustrates waveforms of certain voltages present in the motor of FIG. 1 in reverse operation.

FIG. 3 illustrates the waveforms of certain voltages appearing in the motor of FIG. 1 when in reverse operation. To start a motor in the reverse direction, the voltage waveforms are somewhat the opposite of those shown in FIG. 2. Control circuit 38 continuously applies an alternating voltage to start winding 10 and repetitively applies the alternating voltage to run winding 12 by turning on run triac 20

(dosing the switch) at approximately 90° and 270° into each alternating voltage cycle. The resultant current in the start winding then leads and thus has a phase shift with respect to the resultant current in the run winding, causing the motor to rotate in the opposite direction from that described with respect to FIG. 2.

Although in the preferred embodiment the repetitive application of the alternating voltage to the run winding begins at approximately 90° and 270° into each respective cycle, any starting point in the respective ranges of 45°–135° and 225°–315° would be acceptable.

After the motor is close to synchronous speed, the start and run triacs 18 and 20, respectively, are switched off so that no current is present in the start and run windings for a selected suspension period, such as one-half of a cycle. The length of this suspension period depends on the motor load. The selected suspension period can either be a predetermined duration of time or it can vary with the rate of rotor acceleration. Higher rates of rotor acceleration are expected to require shorter suspension periods. After the suspension period, a continuous alternating voltage is supplied to the run winding.

Figure 4:
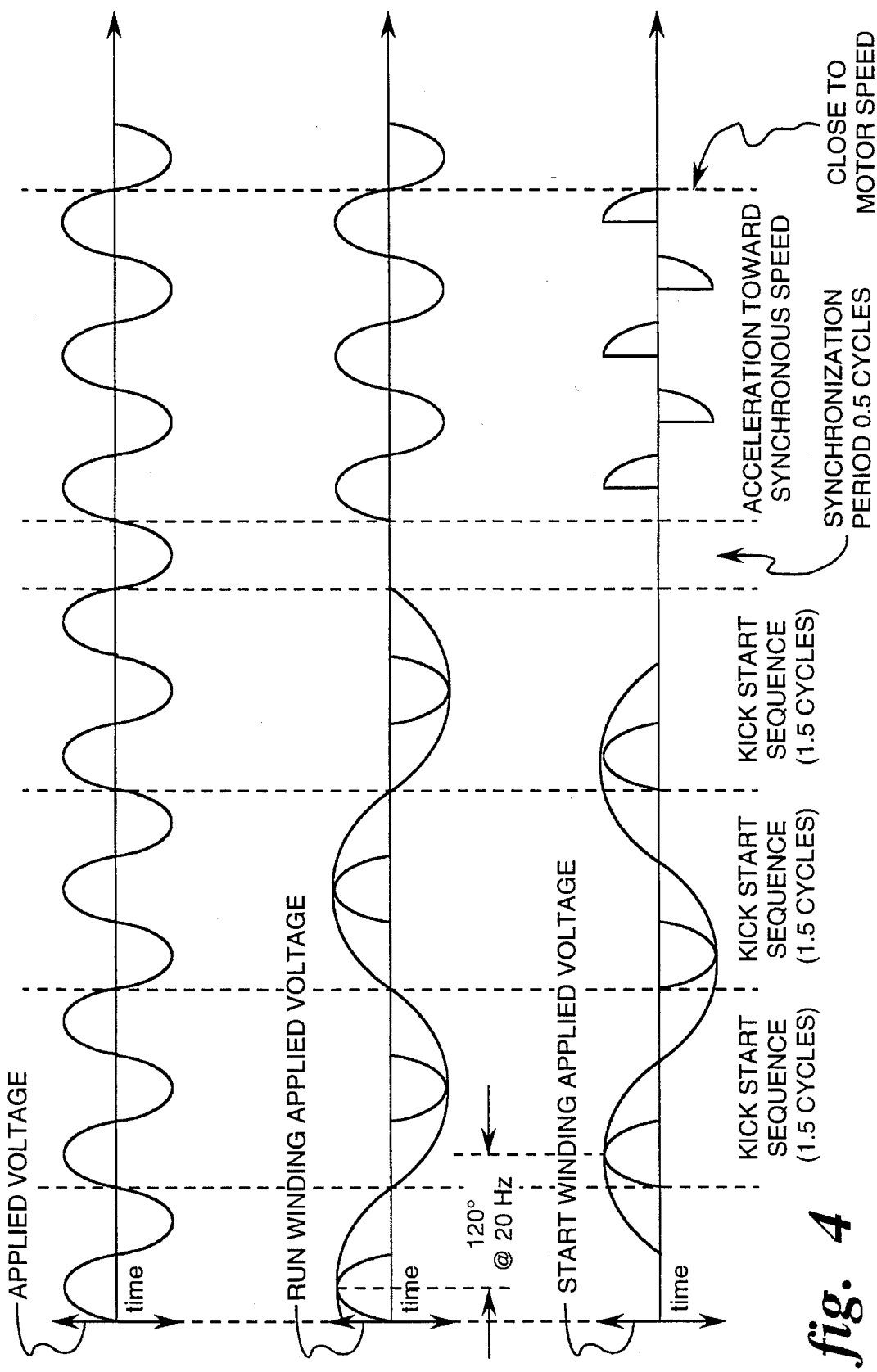
FIG. 4 illustrates waveforms of certain voltages present in the motor of FIG. 1 in forward operation which are useful when a high starting torque is required.

FIG. 4 illustrates the waveforms of certain voltages appearing in the motor of FIG. 1 which are useful when a high starting torque is required. The voltage sequences shown in FIGS. 2 and 3 provide a starting torque which is high enough for some motors, but not other motors. The sequences shown in FIG. 4 increase the starting torque and accelerate the motor toward synchronous speed more quickly than the sequences shown in FIGS. 2 and 3, thus increasing the range of motors in which this invention can be used.

In FIG. 4, there are applied three alternating voltage "kick start" sequences followed by a short synchronization period which, in turn, is followed by the final acceleration of the rotor toward synchronous speed. Each kick start sequence (which in the preferred embodiment is 1.5 cycles or 540°) is comprised of a first fraction of an alternating voltage cycle (preferably one-half of a cycle at 0°–180°) in which voltage is applied to start winding 10 but not run winding 12, followed by a second fraction of a cycle (preferably one-half of a cycle at 180°–360°) in which voltage is applied to the run winding but not the start winding, followed by an interval with a duration of a third fraction of a cycle (preferably one-half of a cycle at 360°–540°) when no voltage is applied to either winding.

As shown in FIG. 4, the first kick start sequence can be preceded by the second fraction (preferably one-half) of a preliminary alternating voltage cycle in which voltage is applied to run winding 12 followed by the third fraction (preferably one-half) of a preliminary cycle when no voltage is applied to either winding.

The preferred sequence applies voltage to the start winding for 180° of the alternating voltage kick start sequence and therefore provides larger amounts of current through the start winding (thus increasing the generated torque) than the sequence shown in FIG. 2 where voltage is applied to the start winding for 70°–80°. The depiction of three alternating voltage kick start sequences is for example only, and any appropriate number of sequences can be used.

The voltage waveforms in the preferred kick start sequences of FIG. 4 repeat every 1080° (every 3 cycles), so the applied voltage to the start and run windings results in two distorted 20 Hz waveforms (assuming a 60 Hz source) with the waveform applied to the start winding delayed relative to the waveform applied to the run winding by 120° of the 20 Hz waveforms. Although a 90° phase shift is optimal, this 120° phase shift with the increased start winding current provides much more starting torque than the 40°–50° phase shift with less start winding current generated while accelerating toward synchronous speed during the starting sequences shown in either of FIGS. 2 and 3.

Because the voltage waveforms in the kick start sequences of FIG. 4 are distorted 20 Hz waveforms (assuming a 60 Hz source) applied to the start and run windings, the maximum shaft speed that the synchronous motor can attain with these waveforms is 600 RPM (revolutions per minute), assuming the motor is rated at 1800 RPM with 60 Hz applied voltage. The control circuit is designed to apply repeated kick start sequences until the shaft speed approaches a predetermined speed (typically about ⅓ of synchronous speed or 600 RPM for a motor rated at 1800 RPM), at which time a brief synchronization period occurs. Then in one embodiment, the control circuit converts to the pulse sequence employed for accelerating toward synchronous speed (the same pulse sequence that is described with respect to FIG. 2).

In an alternative embodiment, the control circuit continuously applies the alternating voltage to run winding 12 and does not repetitively apply the alternating voltage to the start winding. The motor will still start with this technique; however, the period of acceleration toward synchronous speed will require additional time.

The synchronization period shown in FIG. 4 is a single half cycle in which no voltage is applied to either winding. More complex synchronization sequences may be desired, depending on specific load and motor conditions. The synchronization period is important in maximizing the overall motor acceleration toward synchronous speed because slight variations can increase motor acceleration dramatically.

Figure 5:
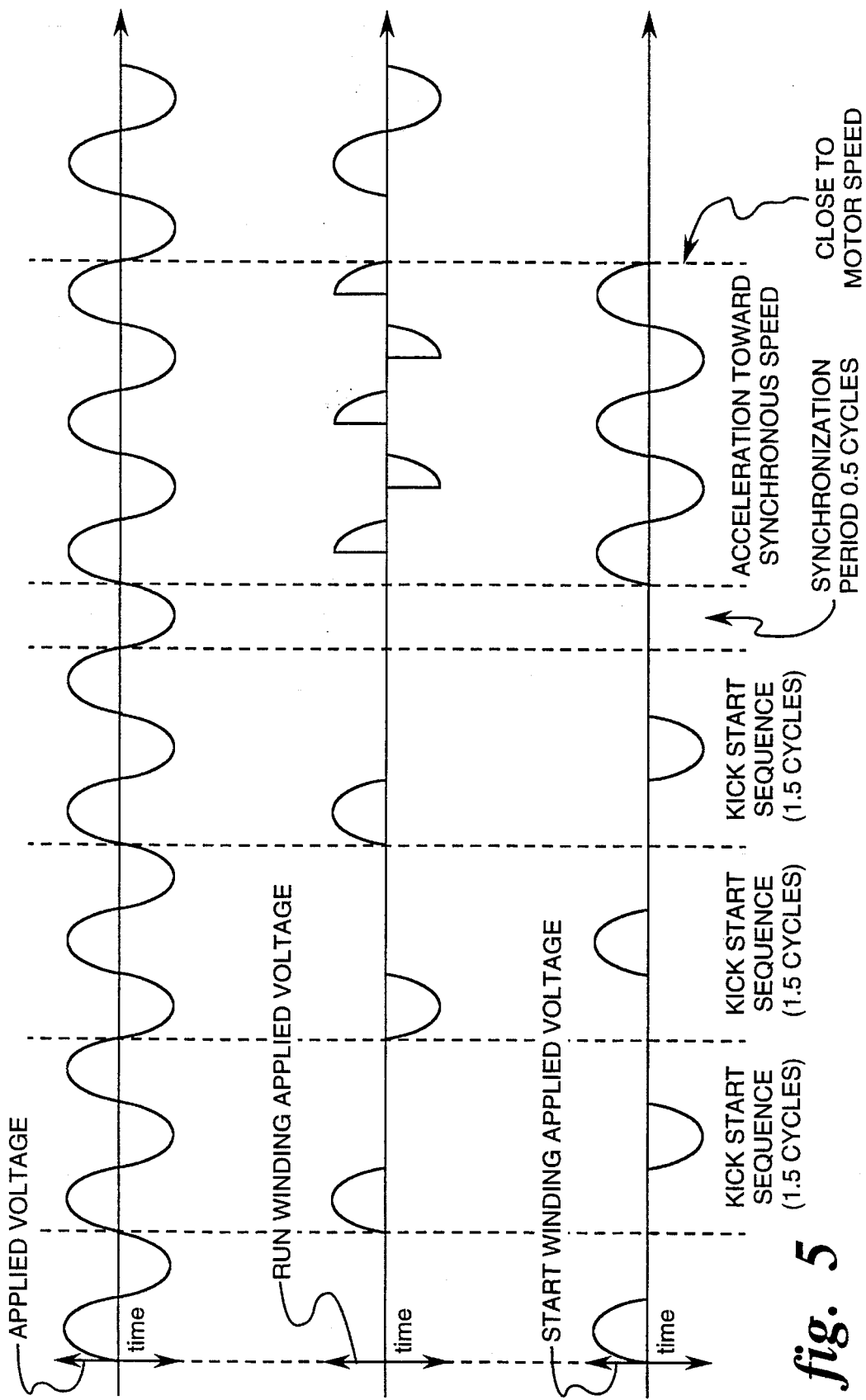
FIG. 5 illustrates waveforms of certain voltages present in the motor of FIG. 1 in reverse operation which are useful when a high starting torque is required.

FIG. 5 illustrates the waveforms of certain voltages appearing in the motor of FIG. 1 in reverse operation, which are useful when a high starting torque is required. The run and start winding waveforms shown in FIG. 5 are somewhat opposite of those shown in FIG. 4. There are similarly applied three alternating voltage "kick start" sequences followed by a short synchronization period which, in turn, is followed by the final acceleration of the rotor toward synchronous speed. In a preferred embodiment, each kick start sequence (which in the preferred embodiment is 1.5 cycles or 540°) is comprised of a first fraction of an alternating voltage cycle (preferably one-half of a cycle at 0°–180°) in which voltage is applied to run winding 12 but not start winding 10, followed by a second fraction of a cycle (preferably one-half of a cycle at 180°–360°) in which voltage is applied to the start winding but not the run winding, followed by an interval with a duration of a third fraction of a cycle (preferably one-half of a cycle at 360°–540°) when no voltage is applied to either winding.

As shown in FIG. 5, the first kick start sequence can be preceded by the second fraction (preferably one-half) of a preliminary alternating voltage cycle in which voltage is applied to start winding 10 and followed by the third fraction (preferably one-half) of the preliminary cycle when no voltage is applied to either winding.

This preferred sequence applies voltage to the run winding for 180° of the alternating voltage kick start sequence and therefore provides larger amounts of current through the run winding (thus increasing the generated torque) than the sequence shown in FIG. 3 where voltage is applied to the run winding for 70°–80°.

After the kick start sequences, a synchronization period occurs, as discussed with respect to FIG. 4, in which no voltage is applied to either winding. Then the control circuit converts to the pulse sequence of accelerating toward synchronous speed (the same pulse sequence that is described with respect to FIG. 3). In an alternative embodiment, the control circuit continuously applies the alternating voltage to the run winding immediately after the synchronization period instead of applying the voltage sequence of FIG. 3 wherein alternating voltage is continuously applied to the start winding and repetitively applied to the run winding before being continuously applied to the run winding.

Although FIGS. 4 and 5 are shown with kick start sequences resulting in a half cycle of alternating voltage applied to each winding every 1.5 cycles, in theory, any frequency can be used. For example, a kick start sequence can be 2.5 or 3.5 cycles instead of 1.5 cycles. When a higher number of cycles are used, the resulting phase shift is closer to 90°; however, the improved phase shift is offset by a lower starting torque. For example, if voltage is applied to each winding of an 1800 RPM motor once every 2.5 cycles, then the maximum RPM is ⅕ of 1800 RPM (360 RPM).

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A single phase induction motor without a starting capacitor, the motor comprising:
    a start winding;
    a run winding coupled in parallel with said start winding;
    a start switch;
    a run switch;
    a control circuit for selectively supplying unphase-shifted line voltage to said start and run windings by controlling said start and run switches, said start switch being coupled between said start winding and said control circuit and said run switch being coupled between said run winding and said control circuit; and
    a current sensor coupled to said control circuit and said start and run switches for measuring current values in said start and run windings and supplying said current values to said control circuit.

2. The motor of claim 1, wherein said start switch comprises a triac, said run switch comprises a triac, and said control circuit includes means for supplying voltage so as to start a rotor in one of a group consisting of forward operation and reverse operation.

3. The motor of claim 1, wherein said current sensor comprises a resistor for converting the current to a corresponding analog voltage signal.

4. The motor of claim 3, wherein said control circuit includes means for converting the current sensor analog voltage signal to a digital signal and supplying the digital signal to calculating means for estimating temperature rise of the motor based on the sensed signal.

5. The motor of claim 4, further including means for turning off at least one of said switches in response to a motor temperature rise exceeding a predetermined level.

6. The motor of claim 5, wherein said calculating means comprise means for modeling the motor temperature rise by time integrating the product of an applied voltage and resulting current in said start and run windings.

7. The motor of claim 1, wherein said control circuit further includes means for determining absence of a decrease in current in said start and run windings below a predetermined locked rotor current value.

8. The motor of claim 1, wherein said control circuit further includes means for detecting current in said start and run windings that is below a predetermined load current value.

9. A method for starting a single phase induction motor having first and second windings and no starting capacitor, comprising the steps of:
    continuously applying an alternating unphase-shifted line voltage to the first winding; and
    repetitively applying said alternating unphase-shifted line voltage to the second winding beginning in the range of 45° to 135° into each respective cycle of said alternating current and ending at approximately 180° into said respective cycle and beginning in the range of 225° to 315° into said respective cycle and ending at approximately 360° into said respective cycle.

10. The method of claim 9, wherein the repetitive applications of said alternating voltage to said second winding begin at approximately 90° and 270°.

11. The method of claim 9, wherein the step of repetitively applying said alternating voltage to the second winding continues until the motor is running at a speed close to synchronous speed.

12. The method of claim 11, further including the step of measuring current in said first and second windings to determine when the motor is running at a speed close to synchronous speed.

13. The method of claim 12, further including the step of calculating an approximate temperature rise of the motor to determine when the motor is overheating.

14. The method of claim 9, further including the steps of stopping the steps of continuously applying an alternating voltage to said first winding and repetitively applying said alternating voltage to said second winding for a selected suspension period; and continuously applying said alternating voltage to said second winding.

15. The method of claim 14, further including the step of measuring current in said first and second windings, wherein the step of stopping application of said alternating voltage to said first winding and the repetitively applied alternating voltage to said second winding for said selected suspension period and the step of continuously applying said alternating voltage to said second winding occur after the measured current has reached a predetermined value indicating that the rotor is close to synchronous speed.

16. The method of claim 14, further including the step of calculating an approximate temperature rise of the motor based upon current in said first and second windings, and stopping application of said alternating voltage to said first and second windings when the calculated temperature rise reaches a predetermined value.

17. A method for starting a single phase induction motor having first and second windings and no starting capacitor, comprising the steps of:
    repetitively providing a sequence including,
        applying an alternating unphase-shifted line voltage to a first winding for a duration of a first fraction of a cycle;
        applying said alternating unphase-shifted line voltage to a second winding for a duration of a second fraction of said cycle; and
        providing an interval in which neither winding receives alternating voltage for a duration of a third fraction of said cycle; and
    thereafter continuously applying said alternating voltage to said second winding.

18. The method of claim 17, further including the step of providing a synchronization period in which neither winding receives alternating voltage immediately prior to continuously applying said alternating voltage to said second winding so as to extend the last interval which occurs before continuously applying said alternating voltage to said second winding.

19. The method of claim 18, further including, after the step of providing the synchronization period, the step of repetitively applying said alternating voltage to said first winding beginning in the range of 45° to 135° into each respective cycle of said alternating voltage and ending at approximately 180° into said each respective cycle and again beginning in the range of 225° to 315° into said each respective cycle and ending at approximately 360° into said each respective cycle until the motor is running at a speed close to synchronous speed.

20. The method of claim 19, wherein the repetitive applications of said alternating voltage to said second winding begin at approximately 90° and 270°.

21. The method of claim 19, further including the step of measuring current in said first and second windings to determine when the motor is running at a speed close to synchronous speed.

22. The method of claim 18, further including, prior to repetitively providing the sequence, the step of applying said alternating voltage to said second winding for a duration of the second fraction of a preliminary cycle and applying said alternating voltage to neither of said first and second windings for a duration of the third fraction of said preliminary cycle.

23. The method of claim 18, further including the step of calculating an approximate temperature rise of the motor to determine when the motor is overheating.

24. A method for starting a single phase induction motor having first and second windings and no starting capacitor, comprising the steps of:
repetitively providing a sequence including,
applying an alternating unphase-shifted line voltage to a first winding for a duration of a first fraction of a cycle;
applying said alternating unphase-shifted line voltage to a second winding for a duration of a second fraction of said cycle; and
providing an interval in which neither winding receives alternating voltage for a duration of a third fraction of said cycle; and
thereafter continuously applying said alternating voltage to said first winding.

25. The method of claim 24, further including the step of providing a synchronization period in which neither winding receives alternating voltage immediately prior to continuously applying said alternating voltage to said first winding so as to extend the last interval which occurs before continuously applying said alternating voltage to said first winding.

26. The method of claim 25, further including, prior to continuously applying said alternating voltage to said first winding and after providing said synchronization period, the steps of:
continuously applying said alternating voltage to said second winding;
repetitively applying said alternating voltage to said first winding beginning in the range of 45° to 135° into each respective cycle of alternating voltage applied to said second winding and ending at approximately 180° into said each respective cycle and beginning in the range of 225° to 315° into said each respective cycle and ending at approximately 360° into said each respective cycle; and
stopping the steps of continuously applying said alternating voltage to said second winding and repetitively applying said alternating voltage to said first winding for a selected suspension period.

27. The method of claim 26, wherein the repetitive applications of said alternating voltage to said first winding begin at approximately 90° and 270°.

28. The method of claim 26, further including the step of measuring current in said first and second windings to determine when the motor is running at a speed close to synchronous speed.

29. The method of claim 25, further including the step of, prior to repetitively providing the sequence, applying said alternating voltage to said second winding for a duration of the second fraction of a preliminary cycle and applying said alternating voltage to neither of said first and second windings for a duration of the third fraction of said preliminary cycle.

30. The method of claim 25, further including the step of calculating an approximate temperature rise of the motor to determine when the motor is overheating.

\* \* \* \* \*